United States Patent
Huang et al.

(10) Patent No.: US 10,384,392 B2
(45) Date of Patent: Aug. 20, 2019

(54) THREE-DIMENSIONAL PRINTING METHOD

(71) Applicants: XYZprinting, Inc., New Taipei (TW); Kinpo Electronics, Inc., New Taipei (TW)

(72) Inventors: Yu-Ting Huang, New Taipei (TW); Shih-Sen Hsieh, New Taipei (TW); Ting-Hsiang Lien, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 49 days.

(21) Appl. No.: 15/641,229

(22) Filed: Jul. 4, 2017

(65) Prior Publication Data
US 2018/0339464 A1    Nov. 29, 2018

(30) Foreign Application Priority Data
May 26, 2017   (TW) .............................. 106117525 A

(51) Int. Cl.
  *B29C 33/72*    (2006.01)
  *B29C 64/00*    (2017.01)
  *B29C 64/118*   (2017.01)
  *B29C 64/112*   (2017.01)
  *B29C 64/209*   (2017.01)
  *B33Y 10/00*    (2015.01)
  (Continued)

(52) U.S. Cl.
  CPC ............ *B29C 64/00* (2017.08); *B29C 64/106* (2017.08); *B29C 64/112* (2017.08); *B29C 64/118* (2017.08); *B29C 64/209* (2017.08); *B29C 64/35* (2017.08); *B33Y 10/00* (2014.12); *B29C 64/40* (2017.08); *B29C 2033/727* (2013.01)

(58) Field of Classification Search
  CPC .............. B29C 33/72; B29C 2033/727; B29C 47/0877; B29C 47/0883; B29C 64/106; B29C 64/112; B29C 64/118; B29C 64/209; B29C 64/35
  USPC .......................................... 264/39, 245, 308
  See application file for complete search history.

(56) References Cited

U.S. PATENT DOCUMENTS

2014/0252684 A1    9/2014   Swanson et al.
2014/0277661 A1    9/2014   Amadio et al.
(Continued)

OTHER PUBLICATIONS

"Search Report of Europe Counterpart Application", dated Apr. 23, 2018, p. 1-p. 8, in which the listed references were cited.

*Primary Examiner* — Leo B Tentoni
(74) *Attorney, Agent, or Firm* — JCIPRNET

(57) ABSTRACT

A three-dimensional printing method for a three-dimensional printer is provided. The three-dimensional printer includes a model printing head, a color printing head, and a platform. The model printing head prints a forming layer on an X-Y plane of the platform. The model printing head and the color printing head are arranged along an X-axis and co-constructed. The three-dimensional printing method includes: providing information of the forming layer and a coloring zone thereof; driving the model printing head by a processor to print the forming layer and at least one material barrier outside the forming layer; and after printing the forming layer and the material barrier, driving the color printing head by the processor to color the coloring zone along a Y-axis, such that the material barrier is located on a moving path of the model printing head during the coloring.

18 Claims, 10 Drawing Sheets

(51) Int. Cl.
    *B29C 64/106*     (2017.01)
    *B29C 64/35*     (2017.01)
    *B29C 64/40*     (2017.01)

(56) References Cited

U.S. PATENT DOCUMENTS

2015/0190967 A1     7/2015   Stava et al.
2016/0096322 A1     4/2016   Cheng et al.
2018/0339459 A1*   11/2018   Hsieh .................... B29C 64/106

* cited by examiner

THREE-DIMENSIONAL PRINTING METHOD

CROSS-REFERENCE TO RELATED APPLICATION

This application claims the priority benefit of Taiwan application serial no. 106117525, filed on May 26, 2017. The entirety of the above-mentioned patent application is hereby incorporated by reference herein and made a part of this specification.

BACKGROUND

Technical Field

The disclosure relates to a three-dimensional printing method.

Description of Related Art

As technology advanced in recent years, many methods that utilize additive manufacturing technology (e.g., layer-by-layer model construction) to build three-dimensional (3D) physical models have been proposed. Generally speaking, the additive manufacturing technology is to transfer data of the design of a 3D model, which is constructed by software, such as computer-aided design (CAD), to multiple thin (quasi-two-dimensional) cross-sectional layers that are stacked in sequence.

Now many techniques have been developed for forming thin cross-sectional layers. For example, according to the information of each of the thin cross-sectional layers described above, a forming material may be sprayed or extruded onto a platform and then cured to form the thin cross-sectional layer, and by stacking such layers, a three-dimensional object can be formed. In addition, a printer may be equipped with a color printing head for coloring the thin cross-sectional layers or the three-dimensional object in or after the manufacturing process of the three-dimensional object.

In view of the above, how to properly execute the printing and coloring of the object in the manufacturing process without interfering with each other is an issue that needs to be addressed in this field.

SUMMARY

The disclosure provides a three-dimensional printing method performed with a model printing head and a color printing head that are synchronously movable, by which a material barrier is formed before coloring, such that the material barrier is on a moving path of the model printing head during the coloring for cleaning the model printing head, so as to improve the printing quality of a forming layer or a three-dimensional object.

The three-dimensional printing method of the disclosure is adapted for a three-dimensional printer. The three-dimensional printer includes a model printing head, a color printing head, and a platform. The model printing head prints a forming layer on an X-Y plane of the platform. The model printing head and the color printing head are arranged along an X-axis and are co-constructed. The three-dimensional printing method includes: providing information of the forming layer and a coloring zone thereof; driving the model printing head by a processor to print at least one material barrier outside a contour range of the forming layer on the platform according to the information of the forming layer and the coloring zone when the forming layer is printed; and after the forming layer and the material barrier are completed, driving the color printing head by the processor to color the coloring zone along a Y-axis, such that the material barrier is located on a moving path of the model printing head as the color printing head performs coloring.

Based on the above, the three-dimensional printer includes the model printing head and the color printing head that are synchronously movable, arranged along the X-axis, and co-constructed. In order to color the forming layer or the three-dimensional object that has been completed as the three-dimensional object is being printed, and prevent the forming material in the model printing head from affecting the printed forming layer when the model printing head passes the forming layer during coloring of the color printing head, as described above, the material barrier is printed in the region outside the forming layer before the coloring, such that the material barrier is located on a moving path of the model printing head during the coloring. Thus, when the coloring is performed, the forming material in the model printing head may come into contact with the material barrier to be attached to the material barrier. In other words, the material barrier scrapes off the material and cleans the model printing head, so as to prevent the forming material in the model printing head from falling onto the forming layer during the coloring to affect the printing quality of the three-dimensional object.

To make the aforementioned and other features and advantages of the disclosure more comprehensible, several embodiments accompanied with figures are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
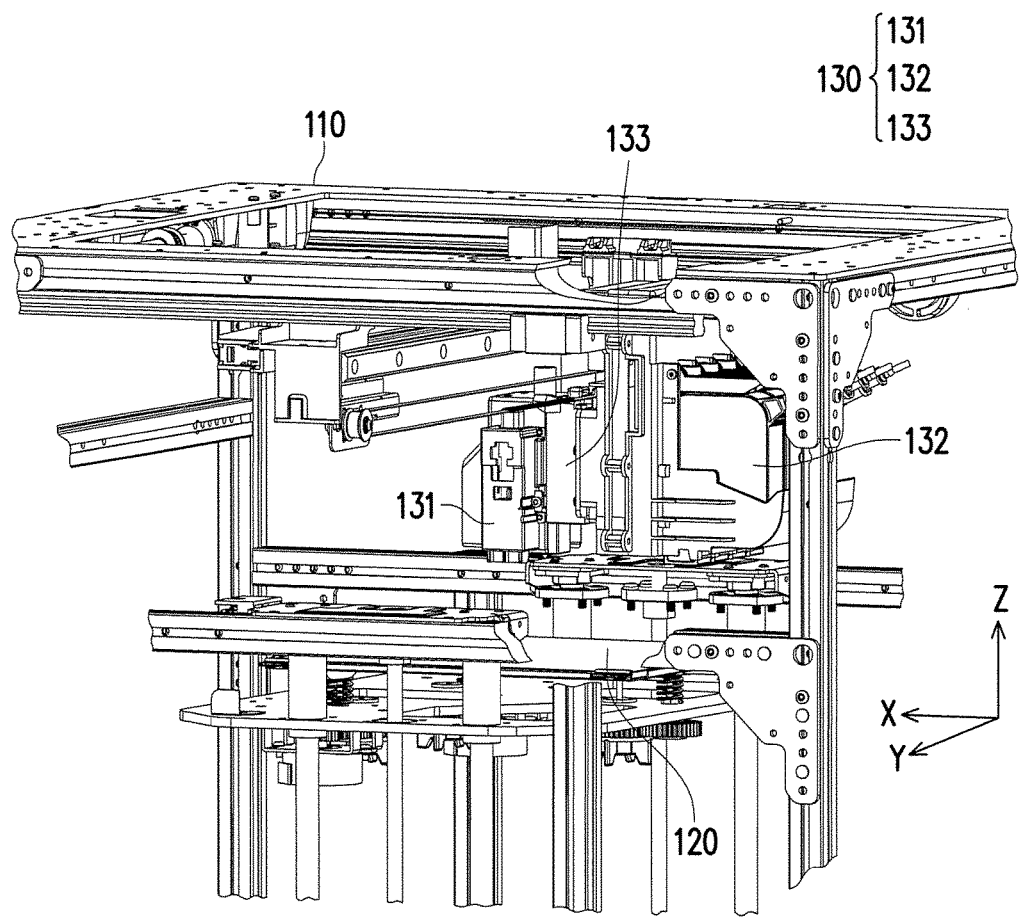
FIG. 1 is a schematic view showing a part of a three-dimensional printer according to an embodiment of the disclosure.
Figure 2A:
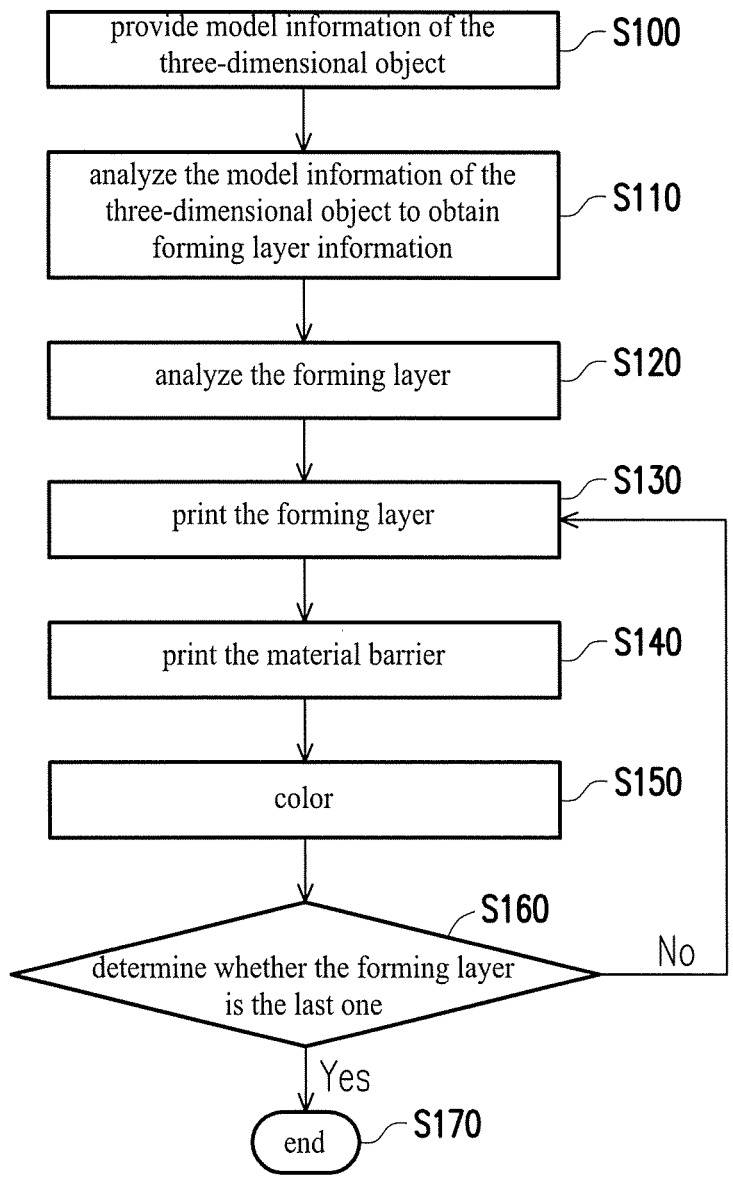
FIG. 2A and FIG. 2B are flowcharts respectively showing a three-dimensional printing method.
Figure 2B:
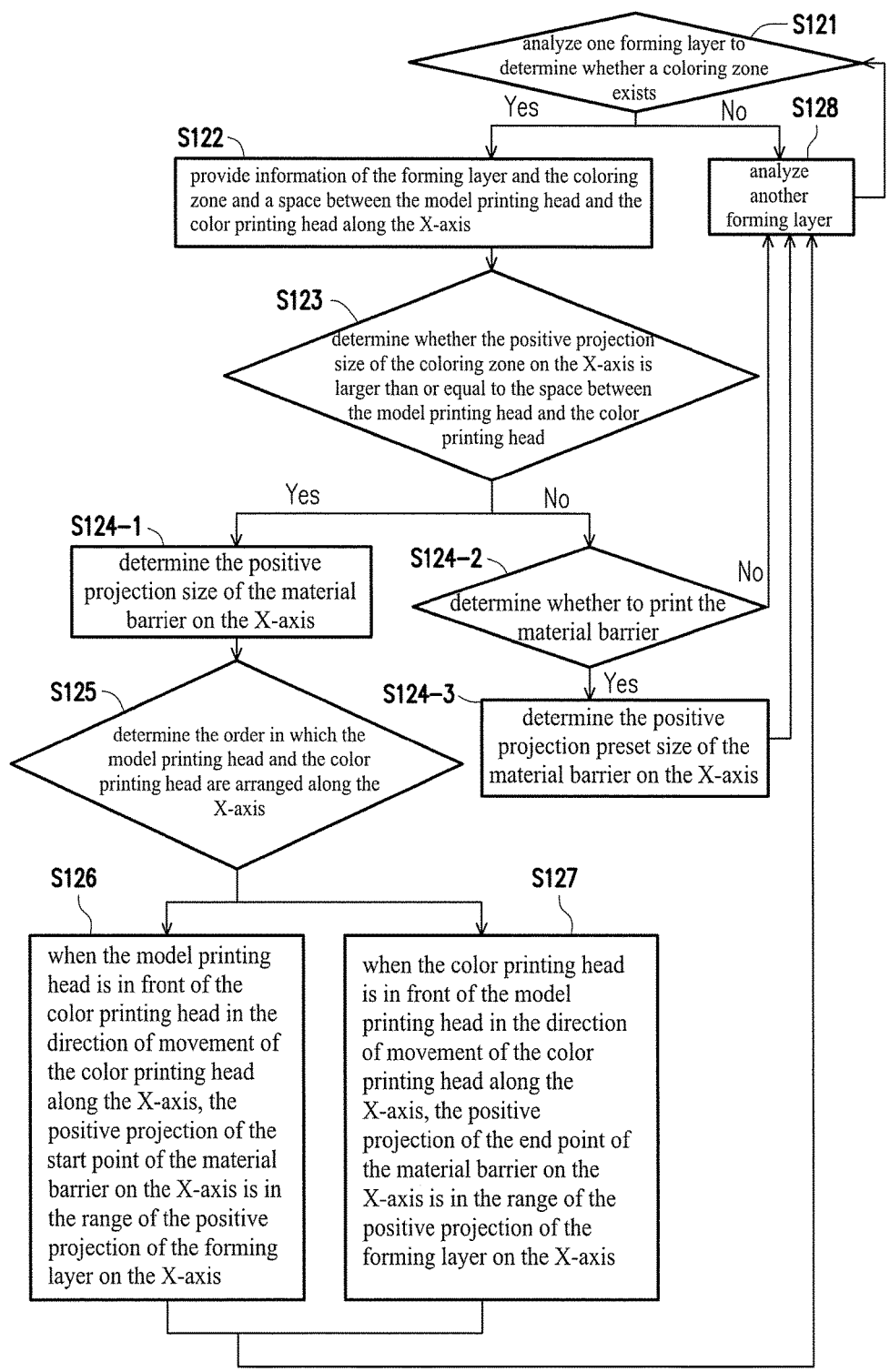
Figure 3:
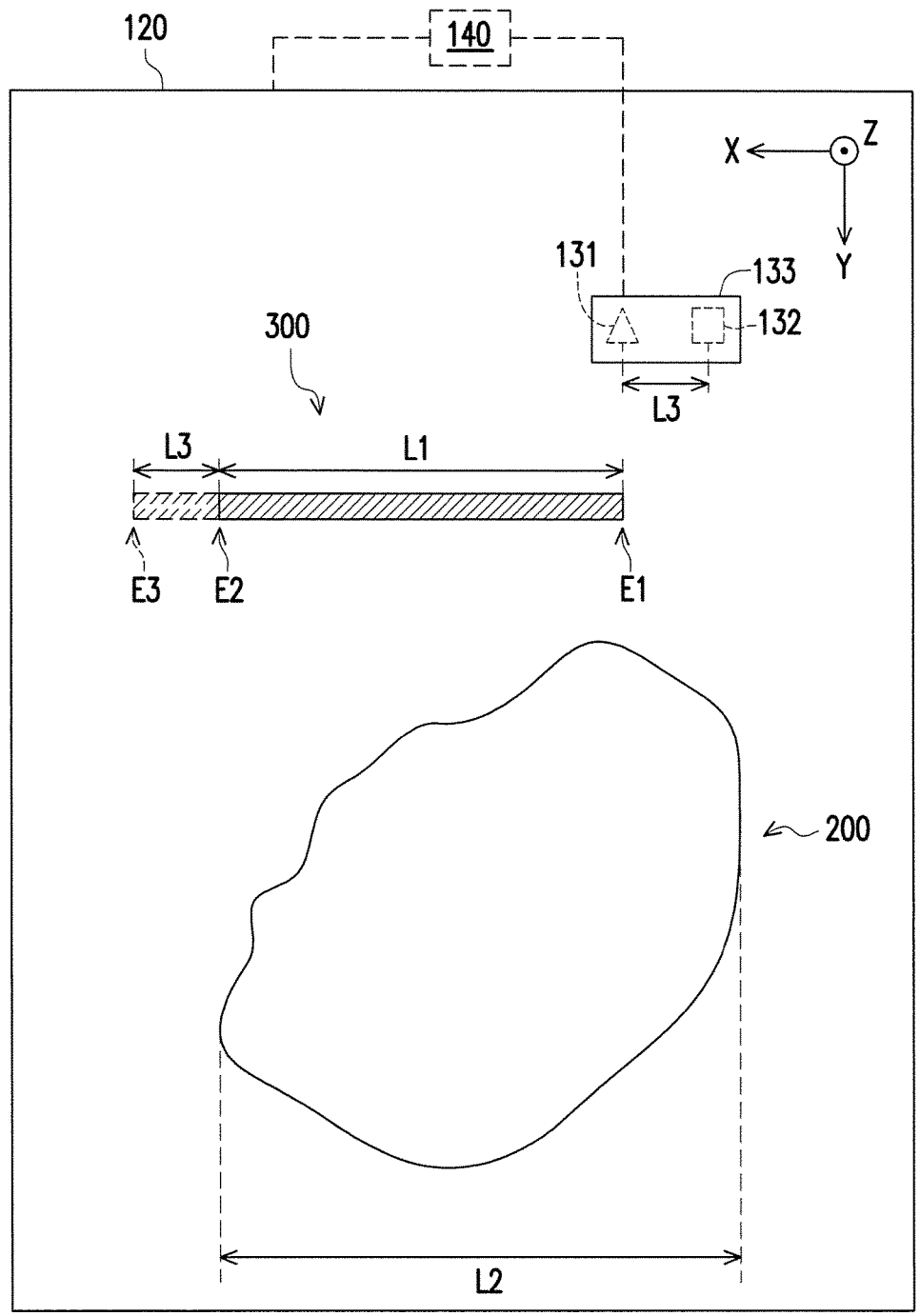
FIG. 3 is a schematic top view showing a part of the three-dimensional printer.

FIG. 1 is a schematic view showing a part of a three-dimensional printer according to an embodiment of the disclosure. FIG. 2A and FIG. 2B are flowcharts respectively showing a three-dimensional printing method. FIG. 3 is a schematic top view showing a part of the three-dimensional printer. Referring to FIG. 1 to FIG. 3, in this embodiment, a three-dimensional printer 100 includes a frame 110, a platform 120, a printing assembly 130, and a control module 140 (shown in FIG. 3). Here, the three-dimensional printer 100 is a fused deposition modeling (FDM) device, for example, which prints forming layers 200 on the platform 120 layer by layer with a model printing head 131 of the printing assembly 130, so as to stack and form a three-dimensional object. The printing assembly 130 further includes a color printing head 132, which is an inkjet head, for example, for coloring the forming layer or the three-dimensional object.

It should be noted that the model printing head 131 and the color printing head 132 of this embodiment are arranged along an X-axis and move synchronously in an interior space of the frame 110. More specifically, as shown in FIG. 1 and FIG. 3, the printing assembly 130 further includes a moving member 133 that is movably assembled to the frame 110 and electrically connected to the control module 140. The model printing head 131 and the color printing head 132 are both assembled to the moving member 133 and thus are movable along with the moving member 133 in the frame 110. Here, the model printing head 131 and the color printing head 132 are disposed on the same moving member 133 to form a co-construction structure. That is, the model printing head 131 and the color printing head 132 may be moved synchronously by one single driving means (by driving the moving member 133 only) (it may be deemed that there is no relative movement between the model printing head 131 and the color printing head 132).

Accordingly, when the color printing head 132 colors the forming layer or the three-dimensional object, the model printing head 131 may pass the forming layer or the three-dimensional object along with the color printing head 132. Moreover, when the model printing head 131 has just completed printing the forming layer or the three-dimensional object, a residual of a forming material may remain in the model printing head 131. Thus, when the model printing head 131 passes the forming layer or the three-dimensional object as described above, the residual of the forming material may drip down or fall onto the forming layer or the three-dimensional object that has been completed.

In order to prevent the residual of the forming material from affecting the quality of the printing target described above, in this embodiment, a three-dimensional printing method is provided, by which the model printing head is driven to perform relevant operations as the color printing head operates, so as to prevent the aforementioned situation from affecting the quality of the forming layer or the three-dimensional object.

It should also be noted that the three-dimensional printing method may be executed as soon as a three-dimensional model is completed. That is, after construction of a three-dimensional object model is completed by computer-aided design, the three-dimensional model may be layer-analyzed based on the three-dimensional method. That is to say, in the process of analyzing the three-dimensional model into multiple forming layers, a processor of the control module 140 may simulate operation modes of the model printing head 131, the color printing head 132, and the moving member 133 to provide an operation command for the three-dimensional printer 100 to actually carry out the printing. In another embodiment, the three-dimensional object model may also be analyzed by another computer device or a processor of a non-three-dimensional printer. After the analysis is completed and the operation command is generated, it is imported into the control module 140 of the three-dimensional printer 100 for carrying out the printing.

Generally, in order to effectively remove the residual of the forming material, in this embodiment, at least one material barrier is formed outside a contour range of the forming layer as the forming layer is printed, and a coloring zone is colored after the forming layer and the material barrier are completed. The material barrier is on a moving path of the model printing head during the coloring, such that the model printing head may come into contact with the material barrier for the material barrier to remove the residual of the forming material. Details are provided hereinafter. Referring to FIG. 2A and FIG. 2B, in this embodiment, first, in Step S100, model information of the three-dimensional object is provided. Next, in Step S110, the model information of the three-dimensional object is analyzed by the processor to obtain forming layer information. Here, the forming layer is formed by transferring design data of a software-constructed 3D model to multiple thin (quasi-two-dimensional) cross-sectional layers that are stacked sequentially. In Step S120, the forming layer is analyzed by the three-dimensional printing method. Then, the processor drives the three-dimensional printer 100 to start the printing according to the corresponding command generated after the analysis, which may include printing the forming layer as in Step S130, printing the material barrier as in Step S140, and coloring as in Step S150 (but the order of Steps S130 to S150 is not limited to the above). Thereafter, in Step S160, whether the printed forming layer is the last forming layer is determined. If it is the last forming layer, in Step S170, the printing and coloring of the three-dimensional object are ended. If it is not the last forming layer, Steps S130 to S150 are repeated till the printing and coloring of the three-dimensional object are completed.

In this embodiment, FIG. 2B further specifies processes of Step S120 of FIG. 2A. That is, the processes of FIG. 2B are to analyze the information of each forming layer, so as to obtain the command for driving the three-dimensional printer 100 afterward.

It should be noted that the three-dimensional printing method of this embodiment is used together with rectangular coordinates X-Y-Z for more specifically define and describe the configuration and movement of the relevant components. Here, the platform 120 has an X-Y plane, and the multiple forming layers are stacked in a positive Z-axis direction to form the three-dimensional object. Nevertheless, the disclosure is not limited thereto. In other words, the components have relative configuration and movement, which may be described in different ways when other coordinate systems are applied, but the relationship among the components remains unchanged.

Referring to FIG. 2B and FIG. 3, in this embodiment, first, in Step S121, one forming layer is analyzed to determine whether the forming layer has the coloring zone. In FIG. 3, one forming layer 200 is depicted as an example. If it is confirmed in Step S121 that the forming layer 200 needs to be colored, Step S122 is executed to provide relevant information of the forming layer and the coloring zone thereof, and a space L3 that exists between the color printing head 132 and the model printing head on the X-axis. As shown in FIG. 3, the entire region of the forming layer 200 of this embodiment is regarded as the coloring zone, wherein an orthogonal projection size thereof on the X-axis is L2 while the space between the two heads is L3. The range of the coloring zone of the forming layer 200 is described in detail later.

Here, the space L3 refers to the orthogonal projection size of the space between the two heads on the X-axis. In the embodiment of the disclosure, the space is described based on the configuration that the model printing head and the color printing head are arranged along the X-axis. However, in an embodiment not shown here, the two heads may also be arranged obliquely in the top view as shown in this embodiment (that is, a connection line between the two heads is oblique with respect to both the X-axis and the Y-axis). In other words, the two heads are displaced on the Y-axis as well. In that case, the space between the two heads is still determined by the orthogonal projection size thereof on the X-axis, so as to serve as the basis for analysis of the disclosure. In Step S122 as described above, preferably, orthogonal projection information of the coloring zone on the X-Y plane is provided to correspond to the space L3, so as to facilitate the subsequent analysis. Of course, when other coordinate systems are applied, there will be appropriate contour definition descriptions.

Generally, when the 3D model information of the three-dimensional object is analyzed into multiple forming layers, each forming layer has contour information as shown in FIG. 3, by which a bounding box of the forming layer 200 on the X-Y plane may be defined, wherein an orthogonal projection size of the forming layer 200 on the X-axis is L2, which indicates the size maximum value along the X-axis when the forming layer 200 corresponds to the rectangular coordinates X-Y-Z.

Then, in Step S123, the relationship between the orthogonal projection size L2 and the space L3 is determined. That is, whether the orthogonal projection size L2 of the coloring zone on the X-axis is larger than or equal to the space L3 between the model printing head 131 and the color printing head 132 is determined. If the result is Yes, Step S124-1 is executed to further determine the orthogonal projection size of the material barrier on the X-axis. If the result is No, Step S124-2 is executed to determine whether to print the material barrier.

The basis for determining the orthogonal projection size of the material barrier on the X-axis in Step S124-1 may correspond to different modes. However, a condition that needs to be met is that the orthogonal projection size L1 of the material barrier on the X-axis needs to be larger than or equal to a difference between the orthogonal projection size L2 of the coloring zone on the X-axis and the space L3, i.e., $L1 \geq L2-L3$.

Referring to FIG. 3, in order to ensure that the model printing head 131 always passes the material barrier 300 before passing the forming layer 200 when the color printing head 132 performs coloring, because the space L3 exists between the model printing head 131 and the color printing head 132 (along the X-axis) as described above, a start point E1 of the material barrier 300 is equivalent to a point that is obtained by displacing a coloring start point of the color printing head 132 on the X-axis by the space L3 in the positive X-axis direction. The material barrier 300 thus further extends in the positive X-axis direction, so where the model printing head 131 no longer passes the forming layer 200 is an end point E2 as shown in the figure. Therefore, the orthogonal projection size L1 of the material barrier 300 on the X-axis, as required in this mode, is equal to the difference between the orthogonal projection size L2 of the coloring zone on the X-axis and the space L3, i.e., $L1=L2-L3$.

In another mode, the color printing head 132 has not yet completed coloring when the model printing head 131 reaches the end point E2 of the material barrier 300, which means that the moving member 133 needs to continue moving in the positive X-axis direction. In order to achieve the same effect of cleaning the model printing head 131 during the coloring of the color printing head 132, the end point of the material barrier 300 may be further extended in the positive X-axis direction from the end point E2 to a new end point E3. In this case, the orthogonal projection size (i.e., L1+L3) of the material barrier 300 on the X-axis is substantially equal to the orthogonal projection size L2 of the coloring zone on the X-axis.

It should also be mentioned that the start point and the end point described here correspond to the order in which the color printing head 132 colors the coloring zone. For example, the color printing head 132 of this embodiment performs the coloring in the positive Y-axis direction and then moves in the positive X-axis direction. Therefore, in the positive X-axis direction, the start point of the material barrier 300 is in back of the end point (the end point is in front of the start point). It also means that during the coloring, the model printing head 131 reaches the start point of the material barrier 300 first. In other words, the positions "front" and "back" in the disclosure are based on the direction of movement of the components with reference to the rectangular coordinates X-Y-Z. Here, the descriptions regarding "front" and "back" also apply to the other embodiments. Likewise, a front edge and an end edge of the forming layer are described on a similar basis. That is, in the positive X-axis direction, the end edge of the forming layer is in front of the front edge of the forming layer.

Figure 4:
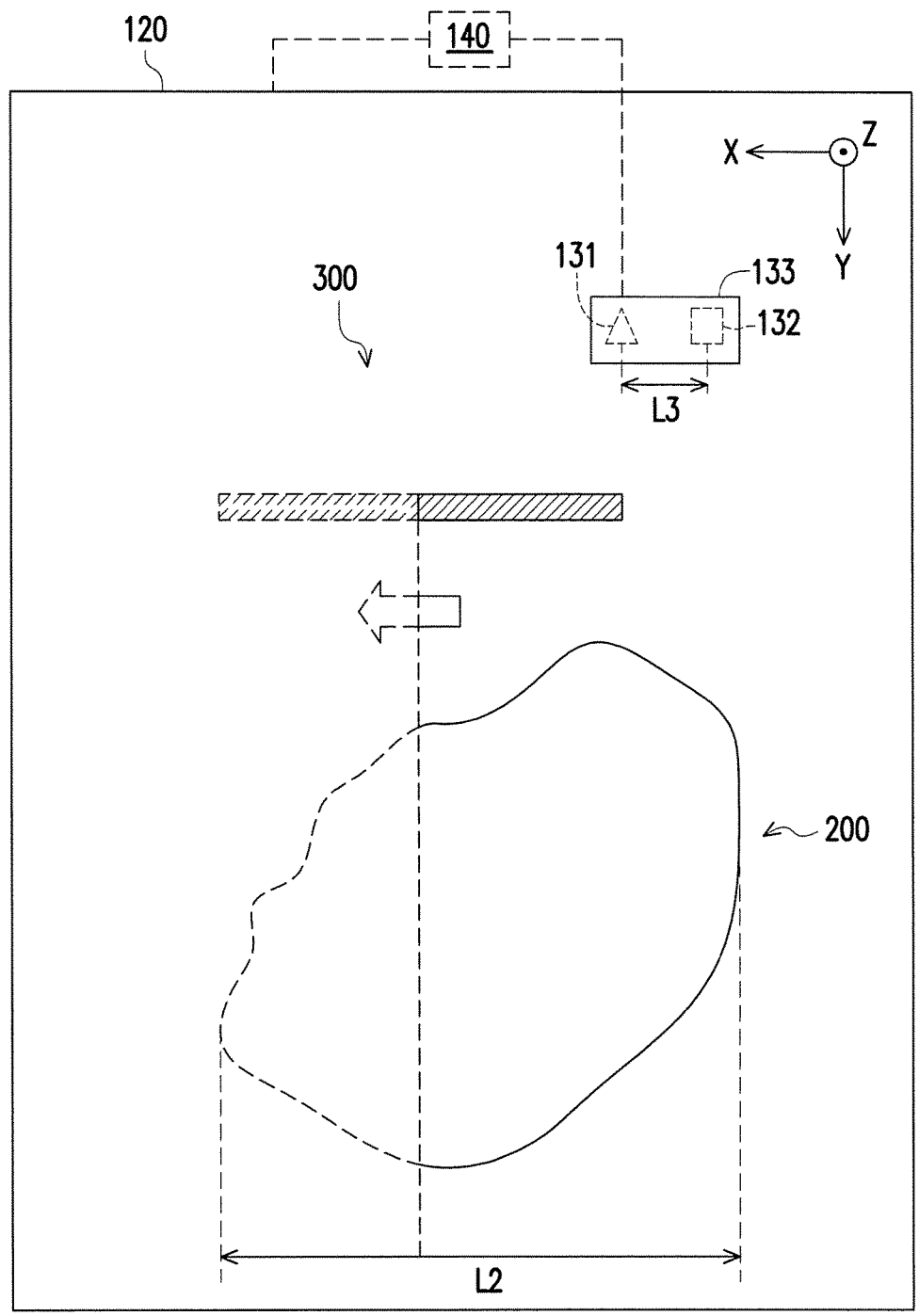
FIG. 4 is a schematic view showing a process of forming a material barrier and a forming layer.

FIG. 4 is a schematic view showing a process of forming the material barrier and the forming layer. The disclosure is not intended to limit the order of completing the material barrier 300 and the forming layer 200. In an embodiment not shown here, the material barrier 300 may be printed after the forming layer 200 is printed. However, in another embodiment not shown here, the material barrier 300 may be printed before the forming layer 200 is printed. In the embodiment shown in FIG. 4, the material barrier 300 and the forming layer 200 are completed at the same time. That is, the model printing head 131 sprays the forming material along the Y-axis and moves sequentially along the X-axis to generate the forming layer 200.

Then, referring to FIG. 2B, after the size of the material barrier is confirmed, in Step S125, the order in which the model printing head 131 and the color printing head 132 are arranged along the X-axis is determined to decide positions of the start point and the end point of the material barrier. In Step S126 of FIG. 2B, as shown in FIG. 3, when the model printing head 131 is arranged in front of the color printing head 132 in the direction of movement of the color printing head 132 along the X-axis (the positive X-axis direction), the orthogonal projection of the start point E1 of the material barrier 300 on the X-axis is in the range of the orthogonal projection of the forming layer 200 on the X-axis. Since the model printing head 131 is disposed in front of the color printing head 132 and the space L3 exists between the two heads along the X-axis, when the color printing head 132 starts the coloring, the orthogonal projection of the model printing head 131 on the X-axis already substantially falls in the contour of the orthogonal projection of the coloring zone of the forming layer 200 on the X-axis, which means that when the color printing head 132 performs the coloring, the model printing head 131 has passed the forming layer 200.

Figure 5:
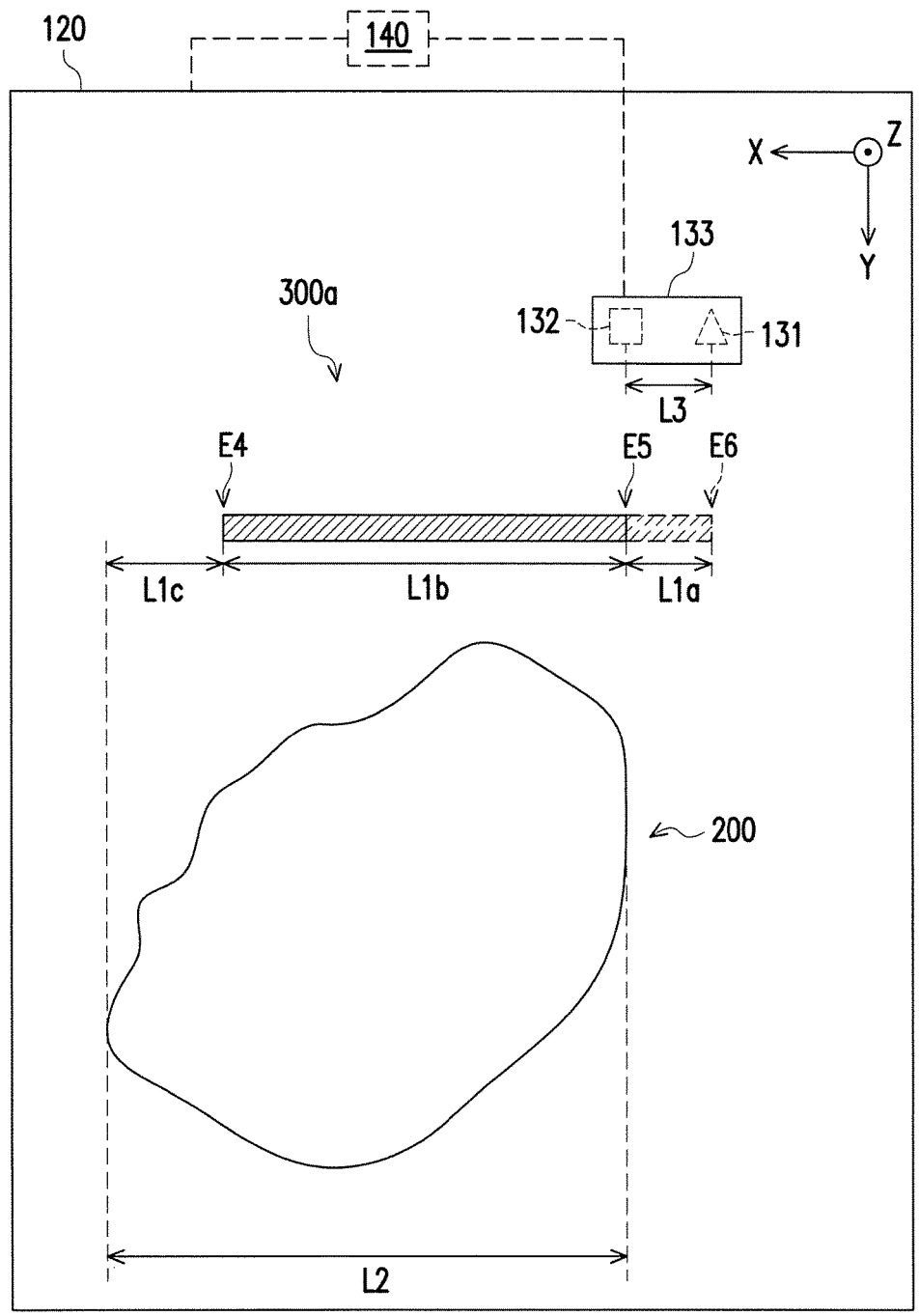
FIG. 5 is a schematic top view showing a part of the three-dimensional printer according to another embodiment.

FIG. 5 is a schematic top view showing a part of the three-dimensional printer according to another embodiment. Referring to FIG. 2B and FIG. 5, in another mode, as shown in Step S127, when the color printing head 132 is arranged in front of the model printing head 131 in the direction of movement of the color printing head 132 along the X-axis (the positive X-axis direction), the orthogonal projection of a start point E5 of a material barrier 300a on the X-axis is in the range of the orthogonal projection of the forming layer 200 on the X-axis. In other words, because the model printing head 131 is disposed in back of the color printing head 132 on the X-axis with the space L3 maintained, when the color printing head 132 starts the coloring, the orthogonal projection of the model printing head 131 on the X-axis is still outside the range of the orthogonal projection of the forming layer 200 on the X-axis. Thus, the model printing head 131 has not passed the forming layer 200 yet. Accordingly, the start point E5 of the material barrier 300a may be set to the coloring start point of the color printing head 132 and therefore extends in the positive X-axis direction, and when the color printing head 132 completes the coloring, the orthogonal projection of the model printing head 131 on the X-axis is at the end point E4. That is, at this time, a orthogonal projection size L1c between the end point E4 and the end edge of the forming layer 200 on the X-axis is equal to the space L3, and at this time, a orthogonal projection size L1b of the material barrier 300a on the X-axis is equal to the difference between the orthogonal projection size L2 of the coloring zone on the X-axis and the space L3, i.e., L1b=L2−L3.

Besides, in order to enhance the cleaning effect for the model printing head 131, in another mode, the model printing head 131 may come into contact with the material barrier 300a earlier to be cleaned when the color printing head 132 performs the coloring and the model printing head 131 has not yet passed the forming layer 200. That is to say, the start point E5 of the material barrier 300a is extended in the negative X-axis direction to a start point E6. At this time, the orthogonal projection size L1a is equal to the space L3, which means that when the color printing head 132 performs the coloring, the model printing head 131 comes into contact with the material barrier 300a to be cleaned. At this time, the orthogonal projection size of the material barrier 300a on the X-axis is L1a+L1b, i.e., L2=L1a+L1b.

Figure 6:
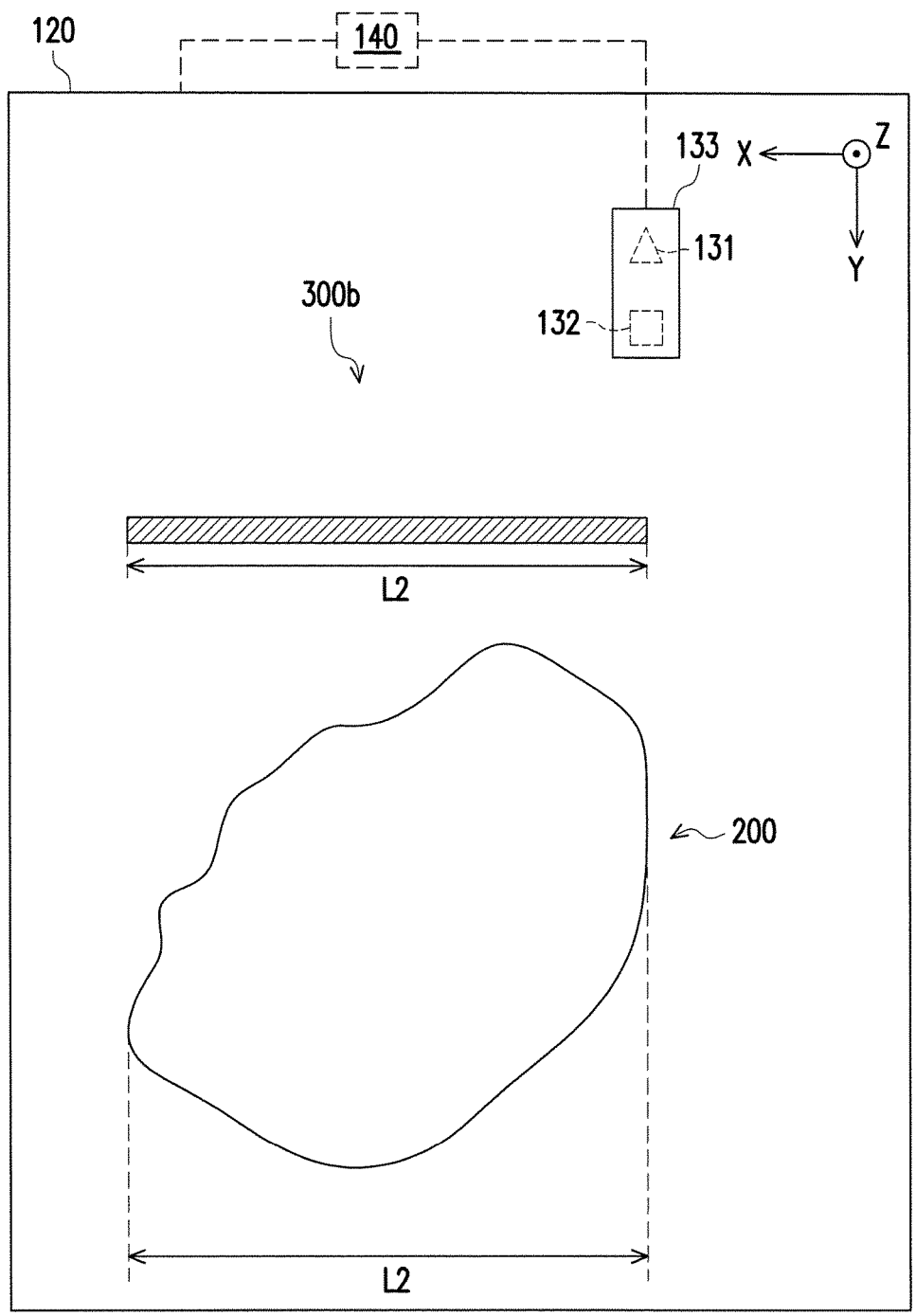
FIG. 6 is a schematic top view showing a part of the three-dimensional printer according to another embodiment.

FIG. 6 is a schematic top view showing a part of the three-dimensional printer according to another embodiment. This embodiment differs from the previous embodiment in that, in this embodiment, the orthogonal projection of the model printing head 131 on the X-axis and the orthogonal projection of the color printing head 132 on the X-axis overlap each other. In other words, no space exists between the model printing head 131 and the color printing head 132 on the X-axis in this embodiment. Accordingly, when the color printing head 132 colors the forming layer 200 along the Y-axis, the model printing head 131 may substantially pass the forming layer 200. Therefore, in this embodiment, the orthogonal projection size of the material barrier 300b on the X-axis is substantially equal to the orthogonal projection size of the coloring zone of the forming layer 200 on the X-axis.

It is known from the aforementioned FIG. 3, FIG. 5, and FIG. 6 that in different modes, the size and configuration of the material barrier are determined according to the coloring performed by the color printing head 132 and the orthogonal projections of the model printing head 131 and the color printing head 132 on the X-axis. In other words, when the space L3 exists between the color printing head 132 and the model printing head 131, the material barriers 300 and 300a are printed and configured in different modes as shown in FIG. 3 and FIG. 5; and when the X-axis configuration does not exist between the two heads (L3 is zero or not existed), the material barrier 300b is printed and configured as shown in FIG. 6. Here, an axial direction of the space L3 and the direction of movement (the positive X-axis direction) of the (model printing and color printing) heads are consistent. Moreover, the start point and the end point of the material barrier also change according to different modes. In one of the modes of FIG. 5 and the mode of FIG. 6, the orthogonal projection of the start point of the material barrier on the X-axis is at the front edge of the orthogonal projection of the forming layer 200 on the X-axis. In terms of FIG. 3 and FIG. 6, the orthogonal projection of the end point of the material barrier on the X-axis is at the end edge of the orthogonal projection of the forming layer 200 on the X-axis. In other words, the orthogonal projection of the material barrier 300b on the X-axis and the orthogonal projection of the coloring zone on the X-axis overlap each other and have the same size.

Figure 7:
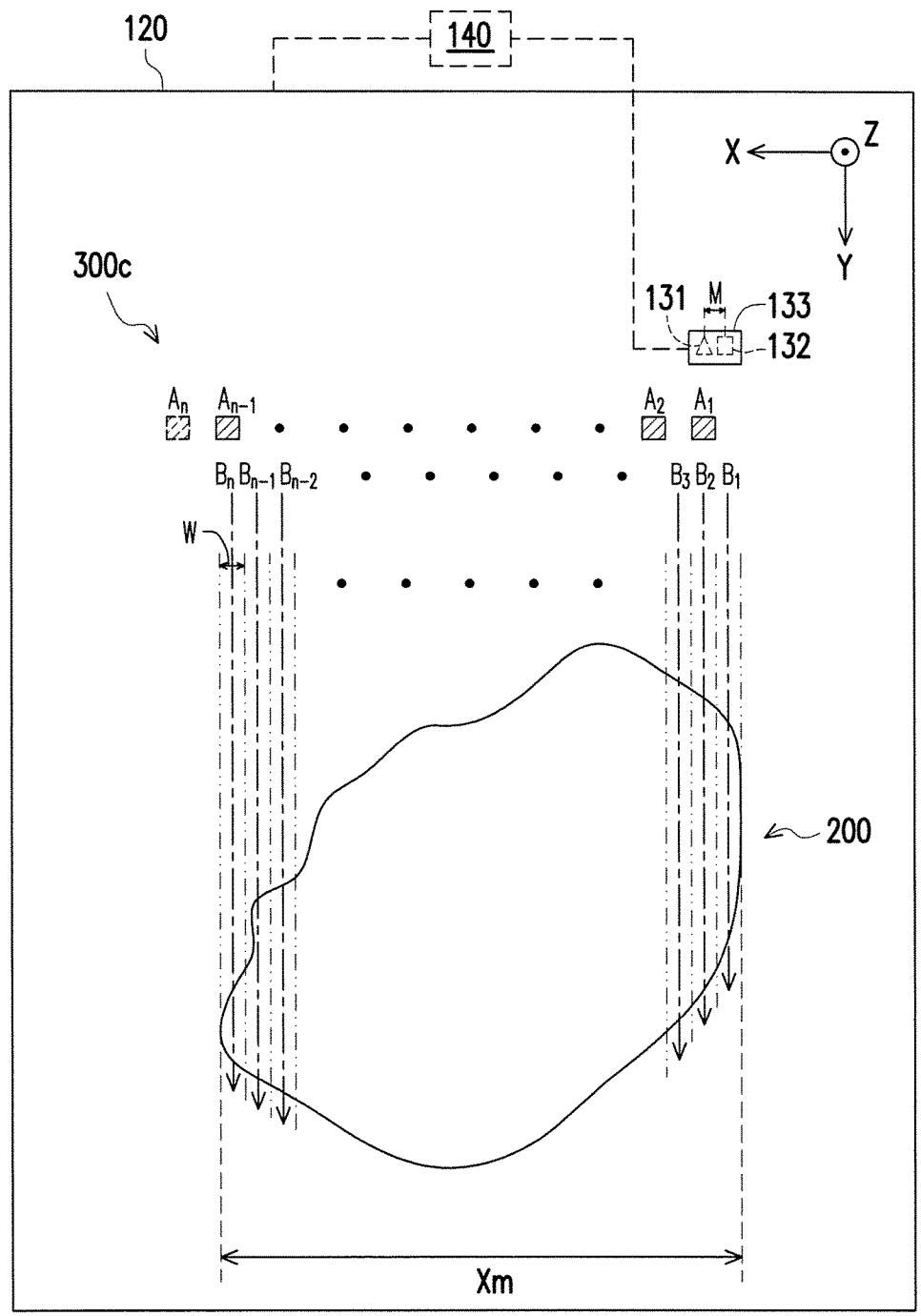
FIG. 7 is a schematic top view showing a part of the three-dimensional printer according to another embodiment.

FIG. 7 is a schematic top view showing a part of the three-dimensional printer according to another embodiment. Here, the corresponding relationship between the material barrier and the foiling layer is described in further detail based on the configuration of FIG. 3 as an example. Referring to FIG. 7, in this embodiment, the model printing head 131 and the color printing head 132 are configured as shown in FIG. 3 described above. That is, in the positive X-axis direction, the model printing head 131 is arranged in front of the color printing head 132, and a space M exists between the two heads along the X-axis. As shown in FIG. 7, the color printing head 132 colors the forming layer 200 along the Y-axis and moves(shifts) along the positive X-axis direction. Therefore, when the forming layer 200 is analyzed, the forming layer 200 is broken down into a plurality of bands that are extended along the Y-axis and arranged along the X-axis. The color printing head 132 colors the forming layer 200 along the bands sequentially. Here, different times of colorings performed by the color printing head 132 are represented by a sequence $\{B_n\}$ as $B_1$, $B_2$, $B_3$, ..., $B_{n-1}$, and $B_n$ respectively, wherein n is a positive integer and a band width W represents a coloring resolution of the color printing head 132 along the X-axis.

As described above, because of the configuration relationship between the model printing head 131 and the color printing head 132 of this embodiment, the model printing head 131 passes the forming layer 200 when the color printing head 132 performs the first printing, i.e., the first coloring ($B_1$). Therefore, the material barrier 300c needs to be disposed in a region $A_1$ outside the forming layer 200. In addition, it is expected to further dispose the material barrier 300c in regions $A_1$, $A_2$, $A_3$, ..., $A_{n-1}$, and $A_n$ as the color printing head 132 performs the colorings of $\{B_n\}$. Here, the regions $A_1$, $A_2$, $A_3$, ..., $A_{n-1}$, and $A_n$ are represented by a sequence $\{A_n\}$, wherein n is a positive integer. Accordingly, the analysis of the forming layer 200 is completed. Later, when the model printing head 131 is driven to perform printing of the forming layer 200, the model printing head 131 is also driven to print the material barrier 300c in the region $\{A_n\}$.

Referring to FIG. 7, as compared with the embodiments of FIG. 3 to FIG. 6, the material barrier printed in the previous embodiments has a continuous structure while the material barrier of FIG. 7 has an intermittent structure. However, both are capable of effectively cleaning the model printing head 131. Moreover, in another embodiment not shown here, similar to the embodiment of FIG. 5 described above, the material barrier 300a may also be formed into the intermittent structure as shown in FIG. 7.

Similar to FIG. 3 as described above, in the direction of movement of the color printing head 132 (the positive X-axis direction), the model printing head 131 is disposed in front of the color printing head 132. Therefore, different modes may be selected to determine the end point E2 or E3 of the material barrier 300. In the embodiment of FIG. 7, different modes may also be selected to set the last region of the material barrier to $A_{n-1}$ or $A_n$.

Here it should be mentioned that the cleaning effect of the disclosure is to move the model printing head 131 past and into contact with the printed material barrier during the coloring of the color printing head 132, so as to apply, adhere, or attach the residual of the forming material in the model printing head 131 onto the material barrier and use the material barrier to scrape the model printing head 131 to remove the residual of the forming material from the model printing head 131. In other words, a height of the material barrier with respect to the X-Y plane is equal to a height of the forming layer with respect to the X-Y plane for the model printing head 131 to contact the material barrier properly.

Besides, in the above embodiment, the material barrier is disposed in front of the forming layer 200 in the coloring direction of the color printing head 132 along the Y-axis (i.e., the positive Y-axis direction). In another embodiment not shown here, the forming layer 200 is disposed in front of the material barrier instead in the coloring direction of the color printing head 132 along the Y-axis. That is, the material barrier is disposed on the lower side of the forming layer 200 in the figure, which also achieves the same material removing effect.

Figure 8:
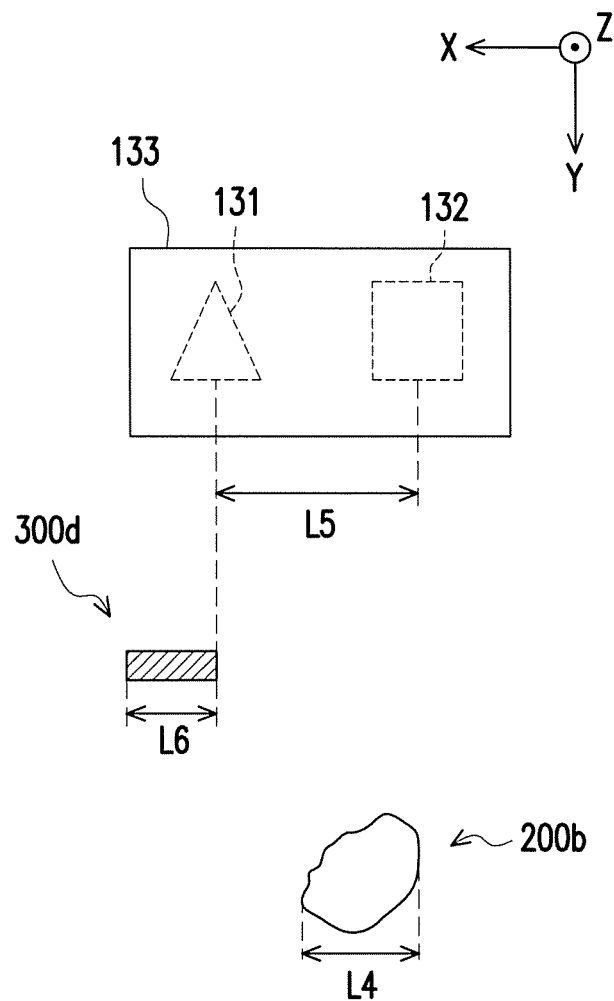
FIG. 8 is a schematic top view showing a part of the three-dimensional printer according to another embodiment.

FIG. 8 is a schematic top view showing a part of the three-dimensional printer according to another embodiment. Referring to FIG. 2B and FIG. 8, another process after the determination performed in Step S123 is described hereinafter. In this embodiment, if the orthogonal projection size L4 of the coloring zone on the X-axis is smaller than the space L5 between the model printing head 131 and the color printing head 132 along the X-axis, Step S124-2 is executed, which is to allow the user to decide whether to print the material barrier. The reason is that, as shown in FIG. 8, the model printing head 131 does not pass the forming layer 200b during the coloring that the color printing head 132 performs on the coloring zone of the forming layer 200b (similarly, in this embodiment, the entire region of the forming layer 200b needs to be colored). Therefore, there is no urgent need to clean the model printing head 131 during the coloring. Thus, in this embodiment, if the user chooses not to print the material barrier, Step S128 is directly executed, and analysis of this forming layer is ended to start the analysis of another foil ling layer.

However, if the model printing head 131 needs to be cleaned to meet certain requirements, Step S124-3 is executed. That is, the material barrier 300d is printed in the region outside the forming layer 200b. In this case, the orthogonal projection size L6 of the material barrier 300d on the X-axis may be determined according to a preset value, and the orthogonal projection size L6 is smaller than or equal to the orthogonal projection size L4 of the forming layer 200b on the X-axis.

Figure 9:
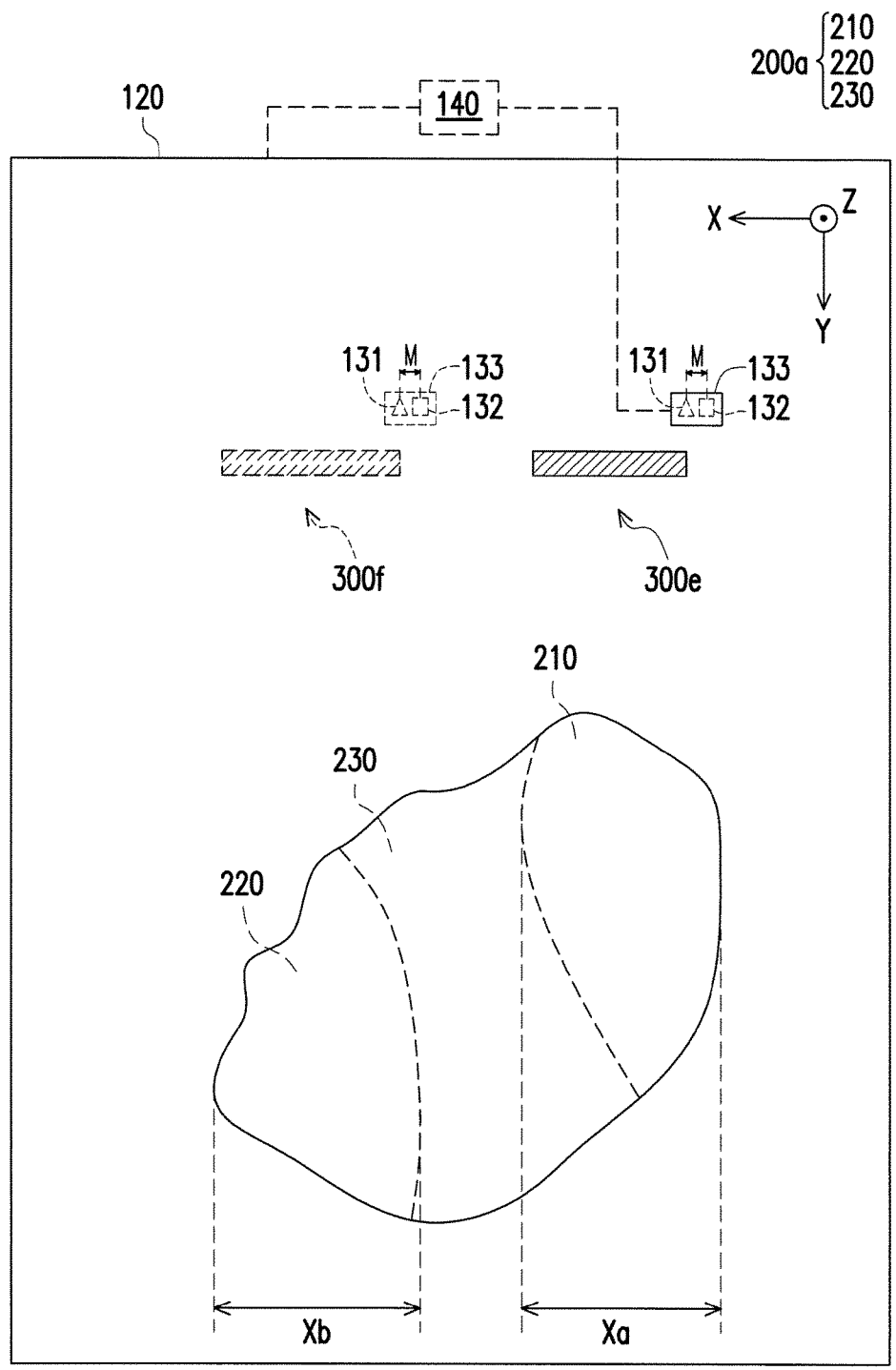
FIG. 9 is a schematic top view showing a part of the three-dimensional printer according to another embodiment.

FIG. 9 is a schematic top view showing a part of the three-dimensional printer according to another embodiment. In the previous embodiment, the entire region of the forming layer is the coloring zone. However, in this embodiment, the forming layer 200a has portions 210, 220, and 230 that are different from one another, wherein the portion 230 does not need to be colored. In other words, the coloring zone covers the different portions 210 and 220 of the forming layer 200a. Nevertheless, the analysis on the coloring zone, as specified in the above-described Step S121 to Step S128, is performed separately for the portions 210 and 220, and orthogonal projection sizes $X_a$ and $X_b$ of the portions 210 and 220 on the X-axis, the configuration of the color printing head 132 and the model printing head 131, and the space M are provided respectively for the respective analyses to form material barriers 300e and 300f in the corresponding regions. Details thereof have been specified above and thus are not repeated hereinafter.

It should also be mentioned that, although one forming layer is analyzed in the above embodiment, generally the three-dimensional object is formed by stacking multiple forming layers and the forming layers substantially have different contours. Thus, in the above embodiment, for one single forming layer, the region for printing the material barrier needs to be outside the forming layer, but for the three-dimensional object, the position of the material barrier should be limited to the region outside the orthogonal projection contour (i.e., the bounding box) of the three-dimensional object on the platform (the X-Y plane), so as to prevent the material barrier from interfering with the three-dimensional object.

For example, if the three-dimensional object has a pyramid shape and is disposed upright on the platform, the first forming layer has the largest area and the areas of the following forming layers decrease sequentially. Thus, in the three-dimensional printing method, the material barrier needs to be disposed by taking the largest forming layer (i.e., the first forming layer) into consideration, so as to put the all printed material barrier outside the contour range of the first forming layer, such that the material barrier which may be outside the contour range of the forming layer in the same level does not fall into the contour range of the previous layer (the first layer) in the subsequent printing.

In another embodiment, if the three-dimensional object has a pyramid shape and is positioned upside down on the platform, the first forming layer has the smallest area and the areas of the following forming layers increase sequentially. Thus, in the three-dimensional printing method, disposition of the material barrier may involve two situations. One is that, according to the three-dimensional printing method described above, the material barrier is printed outside the contour range of the forming layer in the same level, and as the areas of the forming layers increase, the material barrier may expand outward gradually following the forming layers. In other words, the contour range of the following forming layer will cover but not contact the material barrier of the previous layer. Thus, when the three-dimensional object is completed, multiple material barriers are formed and the material barriers gradually expand outward following the forming layers.

The other situation is as described above. That is, the last forming layer (the forming layer having the largest area) is used as the basis, and the material barrier is disposed outside the contour range of the last forming layer. Of course, in the three-dimensional printing method, the aforementioned configurations of the material barrier may also be used in combination according to the requirements.

To conclude the above, in the embodiments of the disclosure, the three-dimensional printer includes the model printing head and the color printing head that form a co-construction structure to be synchronously movable. In order to color the forming layer or the three-dimensional object that has been completed as the three-dimensional object is being printed, and prevent the residual of the forming material in the model printing head from affecting the printed forming layer when the model printing head passes the forming layer during coloring of the color printing head, as described above, the material barrier is printed in the region outside the forming layer before the coloring, such that the material barrier is located on the moving path of the model printing head during the coloring. Thus, when the coloring is performed, the forming material in the model printing head may come into contact with the material barrier to be attached to the material barrier. In other words, the material barrier scrapes off the material and cleans the model printing head, so as to prevent the forming material in the model printing head from falling onto the forming layer during the coloring to affect the printing quality of the three-dimensional object.

In the three-dimensional printing method, during the analysis, the orthogonal projection size of the material barrier on the X-axis that is required is determined according to the orthogonal projection size of the coloring zone of the forming layer on the X-axis and the orthogonal projection size of the space between the two heads on the X-axis. Then, the start point and the end point of the material barrier are determined according to the configuration and positions (front or back) of the two heads on the X-axis. The start point or the end point may be changed as required when the condition is met.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional printing method adapted for a three-dimensional printer, which comprises a model printing head, a color printing head, and a platform, wherein the model printing head prints a forming layer on an X-Y plane of the platform, and the model printing head and the color printing head are arranged along an X-axis and co-constructed, the three-dimensional printing method comprising:
   providing information of the forming layer and a coloring zone of the forming layer;
   driving the model printing head by a processor to print at least one material barrier outside a contour range of the forming layer on the platform according to the information of the forming layer and the coloring zone when printing the forming layer; and
   after completing the forming layer and the material barrier, driving the color printing head by the processor to color the coloring zone along a Y-axis, so that, while the color printing head performs coloring function, a movement of the color printing head drives the model printing head over the forming layer, the material barrier is located on a moving path of the model printing head and a related position of moving path of the color printing head, and the model printing head passes and contacts the material barrier before passing over the forming layer.

2. The three-dimensional printing method according to claim 1, wherein a residual of a forming material remains in the model printing head after the forming layer is printed, and when the model printing head passes and contacts the material barrier, the material barrier removes the residual of the forming material from the model printing head.

3. The three-dimensional printing method according to claim 1, wherein a space exists between the model printing head and the color printing head along the X-axis, and the three-dimensional printing method further comprises:
   determining whether an orthogonal projection size of the coloring zone on the X-axis is larger than or equal to the space.

4. The three-dimensional printing method according to claim 3, wherein:
   when the orthogonal projection size of the coloring zone on the X-axis is larger than or equal to the space, an orthogonal projection size (L1) of the material barrier on the X-axis is larger than or equal to a difference between the orthogonal projection size (L2) of the coloring zone on the X-axis and the space (L3), and $L1 \geq L2-L3$.

5. The three-dimensional printing method according to claim 3, wherein:
   when the orthogonal projection size of the coloring zone on the X-axis is smaller than the space, the orthogonal projection size of the material barrier on the X-axis is larger than or equal to 0.

6. The three-dimensional printing method according to claim 1, wherein:
   determining an order of arranging the model printing head and the color printing head on the X-axis.

7. The three-dimensional printing method according to claim 6, wherein:
   when the model printing head is in front of the color printing head in a direction of movement of the color printing head along the X-axis, an orthogonal projection of a start point of the material barrier on the X-axis is in a range of an orthogonal projection of the forming layer on the X-axis.

8. The three-dimensional printing method according to claim 7, wherein an orthogonal projection of an end point of the material barrier on the X-axis is at an end edge of the orthogonal projection of the forming layer on the X-axis.

9. The three-dimensional printing method according to claim 7, wherein an orthogonal projection of an end point of the material barrier on the X-axis is outside the range of the orthogonal projection of the forming layer on the X-axis.

10. The three-dimensional printing method according to claim 6, wherein:
    when the color printing head is in front of the model printing head in the direction of movement of the color printing head along the X-axis, the orthogonal projection of the end point of the material barrier on the X-axis is in the range of the orthogonal projection of the forming layer on the X-axis.

11. The three-dimensional printing method according to claim 10, wherein the orthogonal projection of the start point of the material barrier on the X-axis is at a front edge of the orthogonal projection of the forming layer on the X-axis.

12. The three-dimensional printing method according to claim 10, wherein the orthogonal projection of the start point of the material barrier on the X-axis is outside the range of the orthogonal projection of the forming layer on the X-axis.

13. The three-dimensional printing method according to claim 1, wherein an orthogonal projection of the material barrier on the X-axis and an orthogonal projection of the coloring zone on the X-axis overlap each other and have the same size.

14. The three-dimensional printing method according to claim 1, wherein in a coloring direction of the color printing head along the Y-axis, the forming layer is in front of the material barrier.

15. The three-dimensional printing method according to claim 1, wherein in a coloring direction of the color printing head along the Y-axis, the material barrier is in front of the forming layer.

16. The three-dimensional printing method according to claim 1, wherein printing of the forming layer and printing of the material barrier are completed simultaneously.

17. The three-dimensional printing method according to claim 1, wherein the material barrier forms a continuous structure or an intermittent structure along the X-axis.

18. The three-dimensional printing method according to claim 1, wherein a height of the material barrier with respect to the X-Y plane is equal to a height of the forming layer with respect to the X-Y plane.

* * * * *